United States Patent [19]

Adamson

[11] Patent Number: 4,948,339
[45] Date of Patent: Aug. 14, 1990

[54] PROPELLER BLADE COUNTERWEIGHT

[75] Inventor: Arthur P. Adamson, Cincinnati, Ohio

[73] Assignee: General Electric Company, Cincinnati, Ohio

[21] Appl. No.: 299,930

[22] Filed: Jan. 23, 1989

[51] Int. Cl.⁵ .............................................. B64C 11/34
[52] U.S. Cl. ...................................... 416/145; 416/89
[58] Field of Search ................. 416/145, 89, 147, 159

[56] References Cited

U.S. PATENT DOCUMENTS

| | | | |
|---|---|---|---|
| Re. 18,957 | 9/1933 | Gobereau et al. | 416/147 X |
| 1,851,874 | 3/1932 | Seppeler | 416/89 |
| 1,920,674 | 8/1933 | Barbarou | 416/89 |
| 1,921,942 | 8/1933 | Ratier | 416/89 |
| 1,955,688 | 4/1934 | Seppeler | 416/89 |
| 2,020,239 | 11/1935 | Coates | 416/140 |
| 2,248,590 | 7/1941 | Smith | 416/205 |
| 2,307,101 | 1/1943 | Blanchard et al. | |
| 2,355,317 | 8/1944 | Moore | 416/89 |
| 2,423,400 | 7/1947 | Nichols . | |
| 2,425,938 | 8/1947 | Hoover . | |
| 2,460,559 | 2/1949 | Wildhaber | 416/145 X |
| 2,514,477 | 7/1950 | Cushman . | |
| 2,518,431 | 8/1950 | Wildhaber . | |
| 2,533,358 | 12/1950 | Cushman . | |
| 2,566,696 | 9/1951 | Cushman . | |
| 3,794,442 | 2/1974 | McMurtry . | |
| 4,717,312 | 1/1988 | Seeley | 416/145 |

Primary Examiner—Everette A. Powell, Jr.
Attorney, Agent, or Firm—Jerome C. Squillaro; Nathan D. Herkamp

[57] ABSTRACT

The invention concerns a system for reducing the resisting torque which must be overcome in changing pitch of aircraft propeller blades. The resisting torque includes gas twisting moment and centrifugal twisting moment. The invention includes a bearing system which derives a torque from radial motion of the blade, the radial motion being induced by centrifugal force. The derived torque opposes the resisting torque. The derived torque can also be used to not only oppose, but also overcome, the resisting torques. Such overcoming can be desirable because the resisting torques can drive the propeller blades into a flat pitch position if the pitch change mechanism fails.

14 Claims, 10 Drawing Sheets

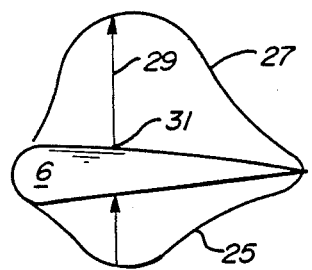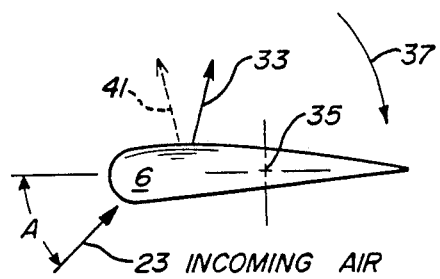
FIG. 4A  FIG. 4B
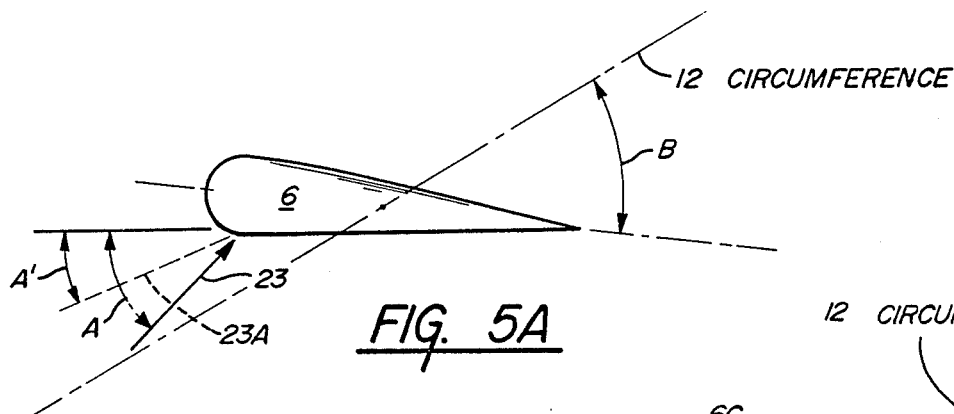
FIG. 5A
FIG. 5B
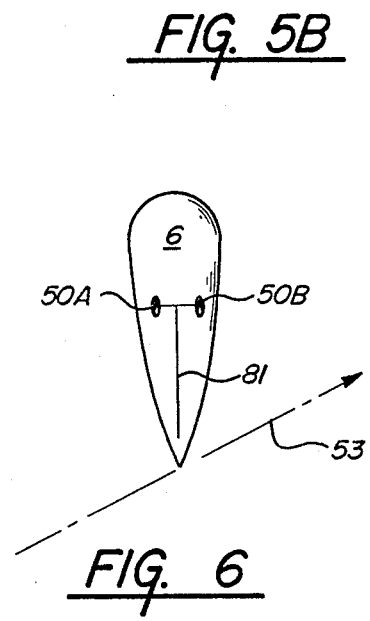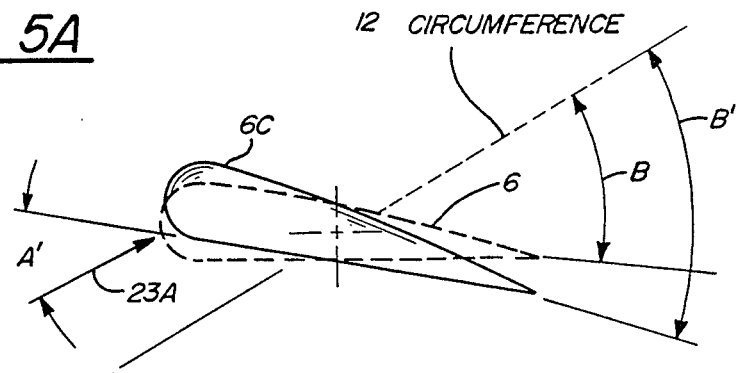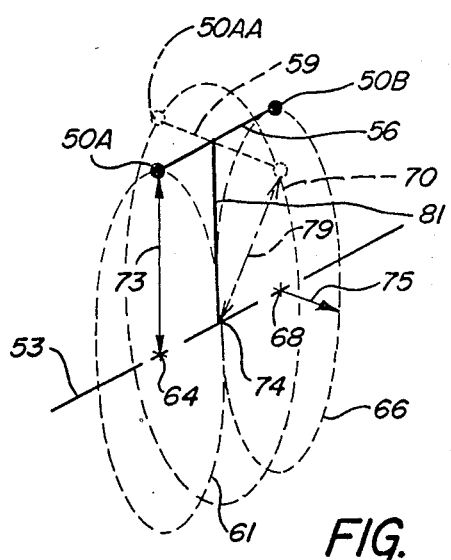
FIG. 6
FIG. 7

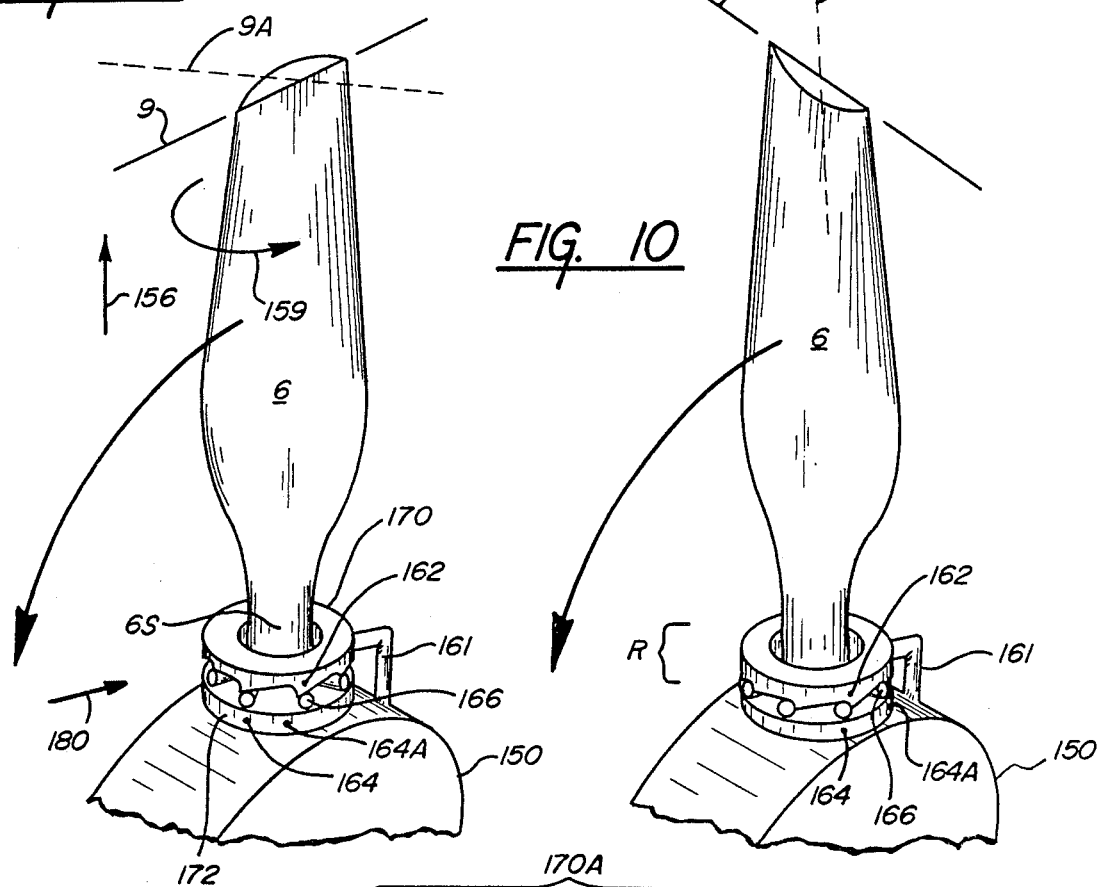
FIG. 9
FIG. 10
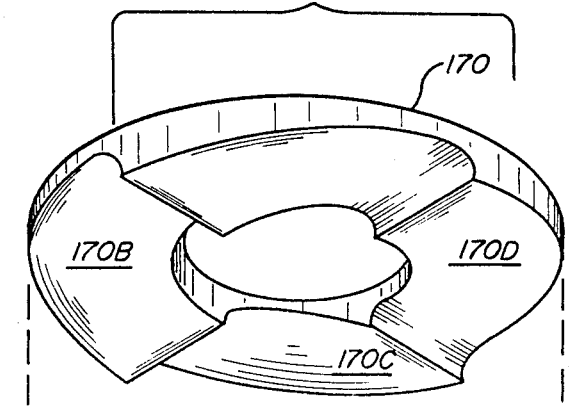
FIG. 11
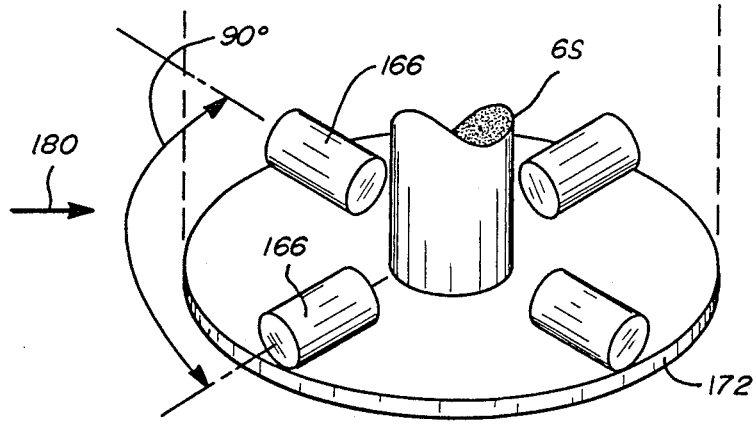

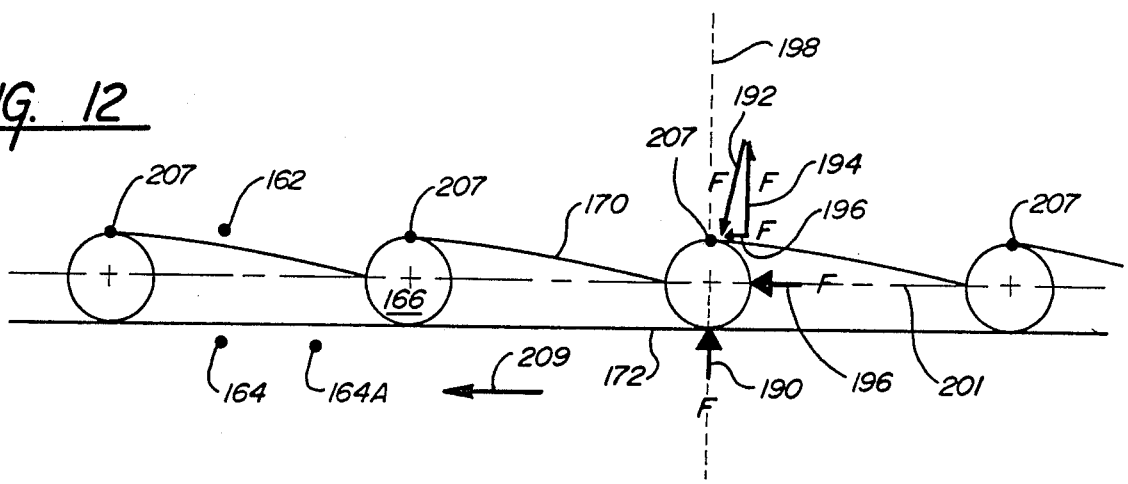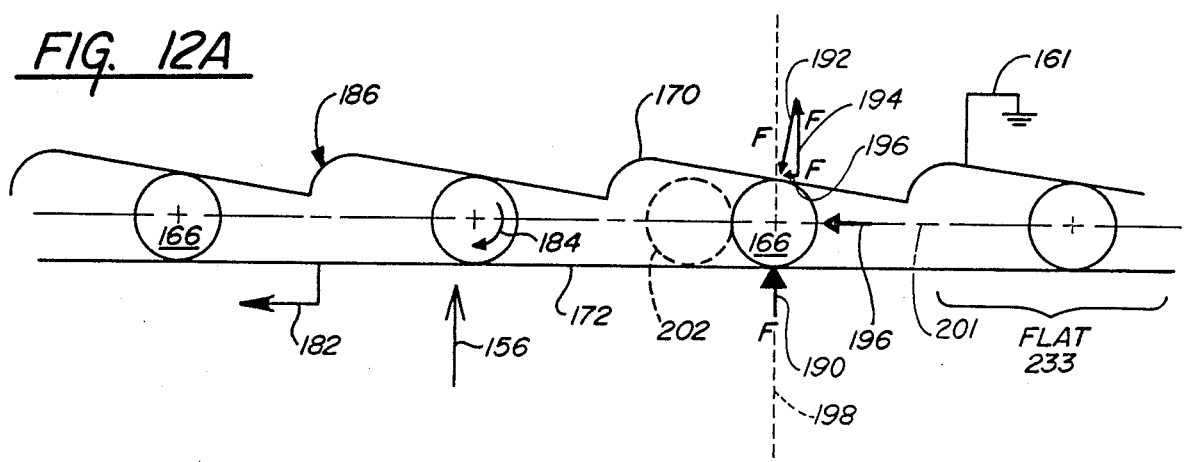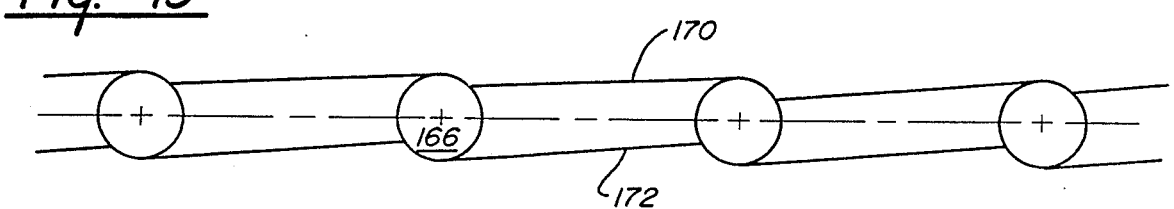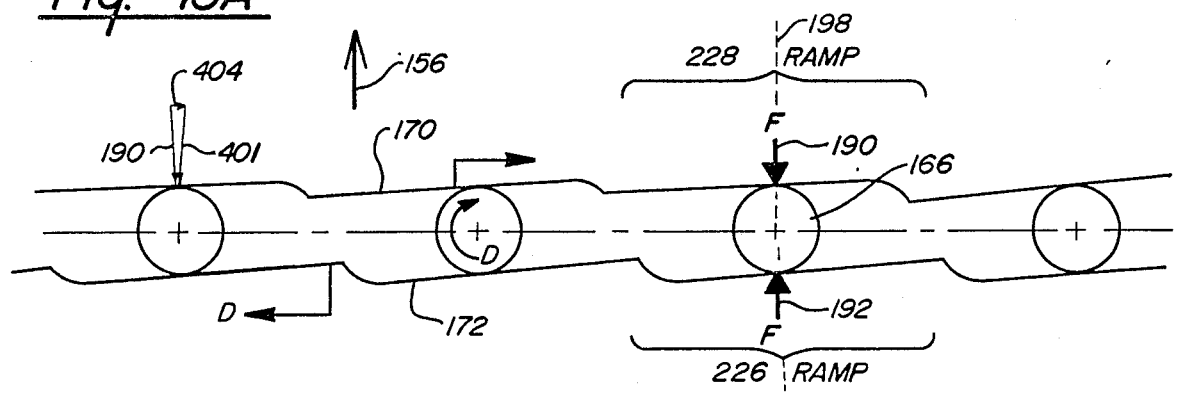

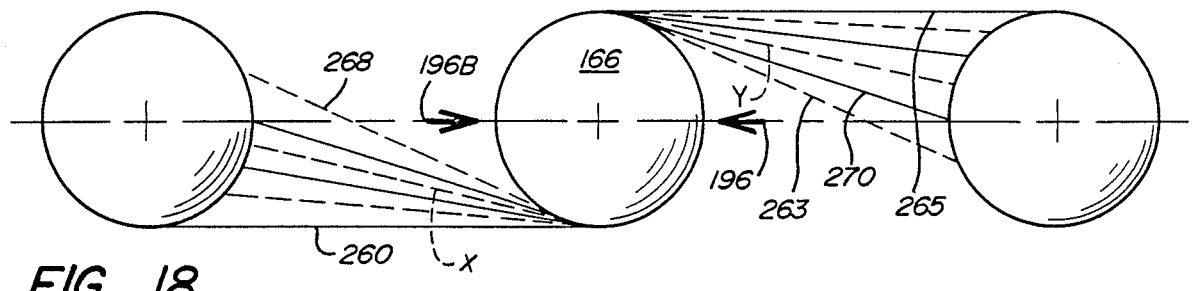
FIG. 18
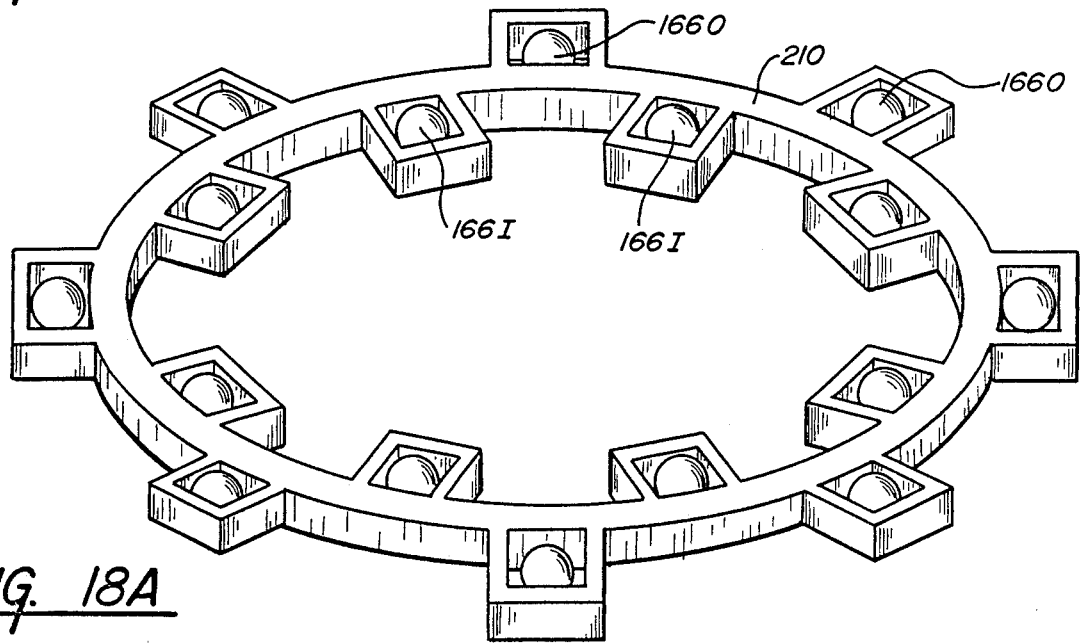
FIG. 18A
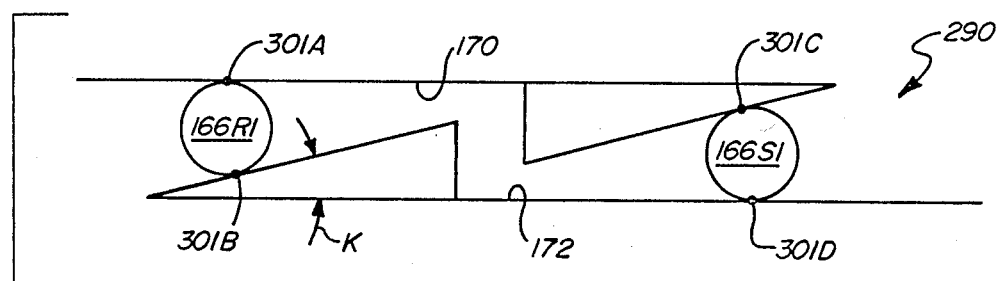
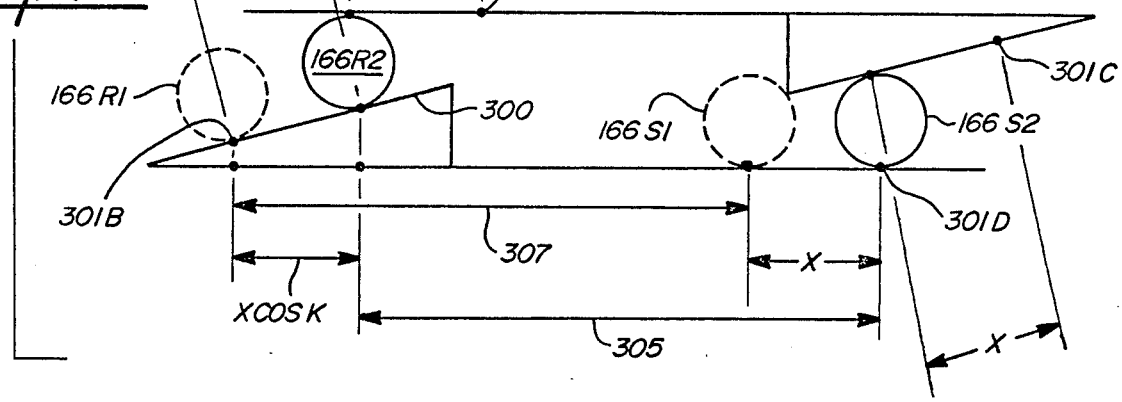
FIG. 19

PROPELLER BLADE COUNTERWEIGHT

The invention relates to systems which drive aircraft propeller blades into a safe pitch angle upon the malfunction of a pitch change mechanism.

BACKGROUND OF THE INVENTION

The following discussion will consider (a) reasons why it is desirable to change pitch in an aircraft propeller and (b) two forces which oppose attempts to change pitch.

The two forces are the centrifugal twisting moment and the gas twisting moment of the propeller blades. These forces, if acting unchecked, tend to drive the pitch to an improper position, and so the pitch change mechanism must overcome them. In case the pitch-change mechanism fails, a back-up system is generally provided to overcome these two forces.

Reason For Pitch Change

FIG. 1 illustrates an aircraft propeller 3, and FIG. 2 is a view of one of the blades 6 taken along arrows 2—2 in FIG. 1. Pitch angle is defined as the angle B in FIG. 2 made between the blade chord 9 and circumference 12, also shown in FIG. 1. Pitch angle can be positive, as shown by solid blade 6 in FIG. 2; pitch angle can be zero (also termed flat pitch), as occurs when the chord line 9 in FIG. 2A coincides with circumference 12; or pitch angle can be negative, as shown by phantom blade 6A in FIG. 2. One reason why it is desirable to change the pitch angle will now be discussed.

In FIG. 3A, the propeller of FIG. 1 is schematically illustrated as a disk 15. The tip 18 of a propeller blade 6 in FIG. 1 is illustrated as point 18 on the disk 15 in FIG. 3A. In flight, the combined forward motion of the aircraft and the rotational motion of the propeller-disk 15 cause point 18 to follow a helical path 21. Accordingly, the incoming airstream seen by propeller blades 6 in FIG. 1 is illustrated by arrow 23 in FIG. 3A, which is also shown in FIG. 5A.

If the rotational speed of the propeller-disk 15 in FIG. 3B is kept constant, but the forward speed increased, as indicated by the longer forward speed vector, the helical path 21A becomes elongated as shown in FIG. 3B, and the incoming airstream changes to that shown by arrow 23A in FIGS. 3B and 5A. That is, the angle of attack A in FIG. 5A of the blade 6 changes to A' as the forward speed changes from that shown in FIG. 3A to that shown in FIG. 3B.

The lift, or thrust, produced by the blade 6 in FIG. 5A changes as angle of attack A changes. Therefore, in order to maintain a constant thrust as forward speed changes, the angle of attack A in FIG. 5A must be kept constant, which is accomplished by changing the pitch angle B in FIG. 2 to that shown as B' in FIG. 5B. In FIG. 5B, phantom blade 6 corresponds to blade 6 in FIG. 5A, while solid blade 6C in FIG. 5B represents the blade, but at the new pitch angle B'.

With such a change in pitch, angle of attack A' in FIG. 5B (for the higher forward speed) now equals angle A in FIG. 5A (for the lower speed). A mechanism is used to change the pitch, but a detailed understanding of pitch change mechanisms is not needed in order to understand the present invention.

The mechanism which changes pitch must overcome, or at least accommodate, three types of force, or moments, namely, the twisting moment (GTM), the centrifugal twisting moment (CTM), and frictional moments (FM).

Gas Twisting Moment

The gas twisting moment can be explained with reference to FIGS. 4A and B. In FIG. 4B, blade cross section 6 is shown in the presence of incoming airstream 23. The blade interacts with the airstream 23 in order to cause a negative pressure distribution 27 in FIG. 4A above the blade, and a positive pressure distribution 25 beneath the blade. The pressure distributions illustrate the magnitude of pressure for each position along blade 6. For example, the length of arrow 29 indicates the magnitude of the pressure at point 31. The reader will note that the arrows in both pressure distributions point in the same direction because the positive pressure distribution 25 on the bottom tends to move the blade in the same direction as the negative distribution 27 on the top of the blade.

The overall vector summation of the two pressure distributions of FIG. 4A can be represented by a single force 33 in FIG. 4B. In general, force 33 causes a moment about the pitch axis 35 which tends to induce rotation of blade 6 as indicated by arrow 37. Further, the actual pressure distributions in FIG. 4A change as a function of angle of attack A in FIG. 4B.

Consequently, a different vector sum, indicated by phantom arrow 41, can arise at a different angle of attack, causing a different moment to occur about pitch axis 35.

The moments applied by arrows 33 and 41 in FIG. 4B are called gas twisting moments, because they are produced by the incoming airstream 23, which is a gas, and they tend to twist, or change pitch of, the blade 6.

Centrifugal Twisting Moment

Centrifugal twisting moment can be explained as follows. Propeller blade 6 in FIG. 1 can be viewed as behaving like two point masses 50A and B in FIG. 6. These masses are redrawn in FIG. 7, wherein axis 53 represents the axis of rotation of propeller 3 in FIG. 1. Two positions of the point masses are shown in FIG. 7. A first position 56 is shown, which represents a pitch angle B, as defined in FIG. 2, of 90°, and which is called a feathered position. A second, phantom pitch position 59, representing the flat pitch situation described in FIG. 2A is also shown.

Centrifugal force causes the point masses to preferentially assume the phantom, flat pitch position 59, as will now be explained. First, two facts about centrifugal force are stated. One, centrifugal force is proportional to $W^2R$, where W is rotational velocity, in radians per second, and R is radius. Two, centrifugal force always acts along a radius, drawn from the center about which the object subject to the force is rotating. The relevance of these two facts will become apparent as this discussion proceeds.

When the blade is in the feathered pitch position, mass 50A in FIG. 7 rotates along circular path 61 about center 64 and mass 50B rotates along path 66 about center 68. However, when the blade is in the flat pitch position, both masses 50A and 50B rotate along a single circular path 70 about point 74.

The radii of circles 61 and 66 are indicated by dimensions 73 and 75, respectively, and are equal, while the radius of the flat pitch circle 70 is indicated by dimension 79. The reader can see that radius 79 is greater than either radius 73 or 75. That is, radius 73 equals the length of arm 81 while radius 79 is the hypotenuse of a triangle in which arm 81 is only one of the sides, and so radius 79 must be longer.

Viewed another way, the point mass prefers to occupy a position, indicated by mass 50AA, of lower energy, rather than a position of higher energy indicated by mass 50B. Centrifugal force drives the point mass downhill from the position of mass 50B to that of mass 50AA, thus causing the point mass to occupy a position farther from its respective center of rotation.

Frictional Moment

Friction between bearings and moving parts of the pitch change mechanism causes resistance to pitch change.

As just demonstrated, the centrifugal twisting moment tends to drive the propeller into the flat pitch position. This position presents a minimal load to the engine (not shown) which is driving the propeller, thus making it possible for the propeller to run away in speed, inflicting damage on itself and the aircraft. Failure of the pitch change mechanism (not shown) can allow this runaway to occur, and fail-safe mechanisms are often provided in propellers in order to prevent runaway.

OBJECTS OF THE INVENTION

An object of the invention is to provide a system for preventing aircraft propellers from attaining unintended flat pitch.

A further object is to constrain the propeller blades to move radially inward as they rotate toward flat pitch, thereby opposing the flat pitch tendencies by centrifugal loading.

A further object of the invention is to counterbalance forces on the blades, such as centrifugal twisting moment and the gas twisting moment, so that the actuation system for changing pitch needs less power to operate.

SUMMARY OF THE INVENTION

In one form of the invention, the shank of a propeller blade is fastened to a propeller hub using type of thread. Centrifugal force, which pulls the blade radially outward, tends to cause rotation of the blade about the pitch axis because of the thread. The particular orientation of the thread causes the rotation to proceed toward a coarser, rather than a finer, pitch.

BRIEF DESCRIPTION OF THE DRAWING

FIG. 4A illustrates the pressure distribution along a typical airfoil.

FIG. 4B illustrates an equivalent single force representing the total force of the pressure distributions of FIG. 4A.

FIG. 5A illustrates the change in angle of attack A which occurs when the helical path taken by the blade tips changes from that shown in FIG. 3A to 3B.

FIG. 5B illustrates a change in blade pitch B.

FIG. 6 illustrates a pair of weights which represent an equivalent mass of a propeller blade.

FIG. 7 illustrates two alternate positions which can be assumed by the weights in FIG. 6.

FIGS. 9 and 10 illustrate another form of the invention.

FIG. 11 illustrates region R in FIG. 10. FIGS. 12 and 12A are views of bearing races in FIG. 9, taken along line 180.

FIGS. 13 and 13A illustrate alternate bearing races which can be used in place of those shown in FIGS. 12 and 12A.

FIG. 18 illustrates various slopes which the races can assume.

FIG. 18A illustrates a second type of bearing cage.

FIG. 19 illustrates the races of FIG. 12, but in a different form.

DETAILED DESCRIPTION OF THE INVENTION

Figure 2:
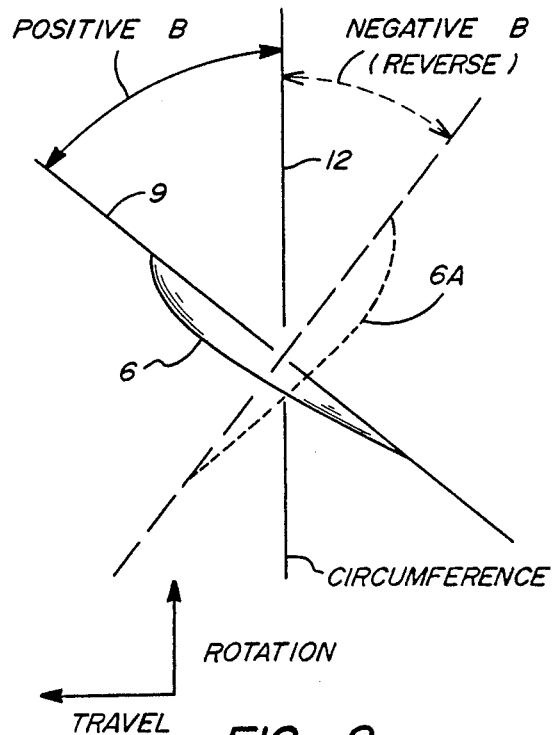
FIG. 2 is a view of FIG. 1 taken along lines 2—2, and shows the meaning of blade pitch angle.
Figure 8:
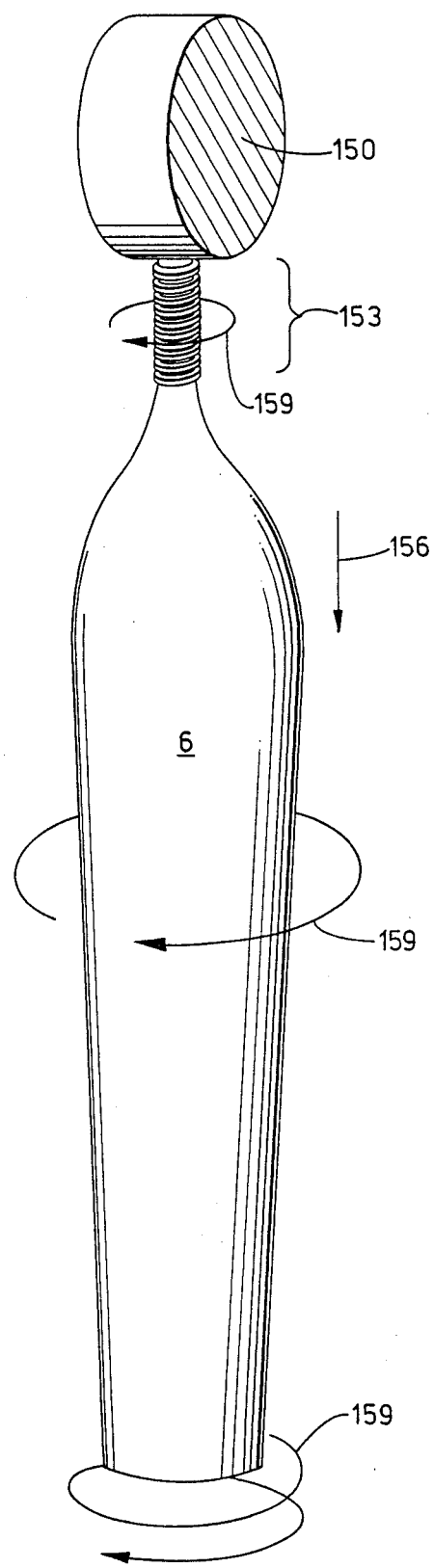
FIG. 8 is a schematic which illustrates, in simplified manner, one form of the invention.

FIG. 8 is a highly simplified view of one form of the invention. Propeller blade 6 is fastened to a hub 150 by a thread 153. If friction is ignored, centrifugal force, acting in the direction of arrow 156, causes the thread to "unscrew" from the hub 150, thereby causing rotation of the blade indicated by arrows 159. Motion limiters (not shown) can be used to stop rotation 159 when the blade reaches feathered pitch, wherein the pitch angle B in FIG. 2 is ninety degrees.

The pitch of the screw (as defined in the art, and which is different than the "pitch" of the propeller blade) can be chosen so that the screw induces rotation of the blade via a moment which overbalances the previously discussed GTM, CTM, and FM. The rotation drives the blade to feathered pitch instead of flat pitch in the event that a loss of control of blade pitch is experienced.

Another form of the invention is shown in FIGS. 9, 10 and 11. Blade 6 in FIG. 9 extends through an outer bearing race 170, which is fastened to the hub 150, as indicated by arm 161, and the blade shank 6S connects to an inner race 172. The races are also shown in FIG. 11, as are bearings 166 and shank 6S. The inner race 172 is shown as a flat disc, while the outer race 170 contains four ramps 170A–D.

Centrifugal force, acting in the direction of arrow 156 in FIG. 9, causes the inner race 172 to drive the bearings 166 against the ramped outer race 170, thereby causing the inner race 172 to rotate in the direction of arrow 159, thus changing pitch of the blade 6. The blade is driven into a feathered position, shown in FIG. 10, wherein the chord line 9 is parallel with the axis of rotation 53 in FIG. 1. Feathered pitch represents a high load upon the engine (not shown) driving the propeller, and thus limits propeller speed.

The bearing system of these FIGS. 9, 10 and 11 is analogous in function to the thread 153 of FIG. 8, with ramps 170A–D in FIG. 6 corresponding to the threads, and bearings 166 serving to reduce friction.

A more detailed discussion of the shapes of the ramps 170A–D in FIG. 11 will now be given. FIGS. 12 and 12A are views of the races taken along arrows 180 in FIGS. 9 and 11. When the races 170 and 172 are in the relative positions shown in FIG. 12A, centrifugal force 56 causes the inner race 172 to move in the direction of arrow 182 with respect to outer race 170, which does not move, as indicated by ground symbol 161, which corresponds in function to arm 161 in FIG. 9.

This relative motion causes bearings 166 to rotate, as indicated by arrow 184, until they reach the position shown in FIG. 12. The travel of the bearings 166 is limited by stops 186 in FIG. 12A.

One problem resulting from the configuration of FIG. 12A is the wedging action which tends to dislodge the bearings 166 from their intended positions. That is, the races 170 and 172 apply forces 190 and 192 which are normal (i.e., perpendicular) to the bearing surfaces at the points of contact of the bearings 166. These forces are not colinear, as indicated by line 198. Force 192 can be resolved into two components 194 and 196. Component 194 acts along line 198, and is thus opposed by force 190. However, the other component 196, redrawn on the centerline 201 of bearing 166, is not opposed when the races are in the position shown in FIG. 12A. Therefore, force 196 can displace bearings 166 into phantom position 202. Such displacement is not desirable because the compressive load of the displaced bearing 202 now becomes distributed among the other bearings. The other bearings become more heavily loaded.

Further, even if bearings are not displaced from their intended positions on the outer race 170, a long term effect of the force 196 is that the bearings 166 can skid or slide along the lower race 172. This skidding can be understood by imagining that the bearings in FIG. 12 are welded to outer race 170 at points 207. Then the inner race 172 is moved in the direction of arrow 209, while the outer race 170 remains stationary. Thus, the bearings 166 skid along the inner race 172.

As a result, reference mark 162 in FIG. 12 becomes displaced from reference mark 164. Mark 164A, in effect, takes the position of mark 164, in the sense that the point on the inner race 172 located at mark 164A now becomes located below mark 162. Therefore, after skidding, when the bearings assume the position shown in FIG. 12A, the chord line 9 of the blade 6 in FIG. 9 becomes displaced to that indicated by line 9A. That is, mark 164A in FIG. 9 assumes the position of mark 164. Consequently, when the bearings are now driven to the position shown in FIG. 15, the feathered pitch position of FIG. 10 is not attained: the chord line takes the position of line 9B in FIG. 9 instead.

One solution to the displacement caused by force 196 is to eliminate that force. Elimination can be accomplished by arranging the race surfaces to be parallel, as indicated in FIGS. 13 and 13A. With such parallel surfaces, the forces upon the bearing rollers 166 are colinear, as indicated by forces 190 and 192 on line 198 in FIG. 13A. Force component 196 in FIG. 12A is eliminated, and so the tendency to dislocate bearing 166 in FIG. 12A to phantom position 202 is eliminated.

However, even with the elimination of component 196, it is believed that repeated excursions of the races 170 and 172 between the positions shown in FIGS. 13 and 13A will eventually cause slight slippage or creep, thus causing loss of correspondence of the reference marks as illustrated in FIG. 12. Mounting the rollers 166 in a cage 210 in FIG. 15 can reduce the slippage problem somewhat, because then all rollers must slip simultaneously, which seems less likely to occur than the non-simultaneous slippage of individual rollers in the absence of a cage.

Figure 15:
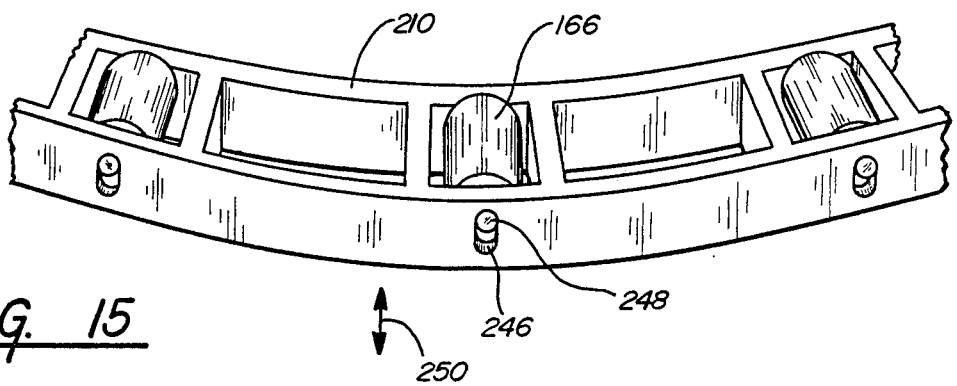
FIG. 15 illustrates a cage for containing the bearing rollers.
Figure 16:
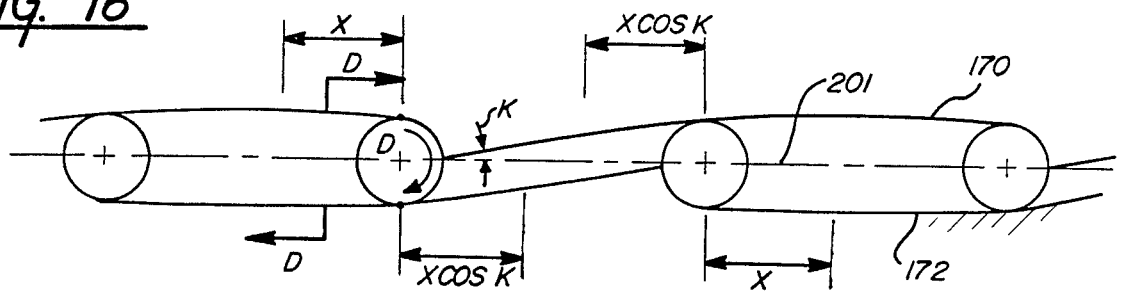
FIGS. 16, 16A and 16B illustrate still another alternate pair of bearing races which can be used in place of those shown in FIGS. 12 and 12A.
Figure 16A:
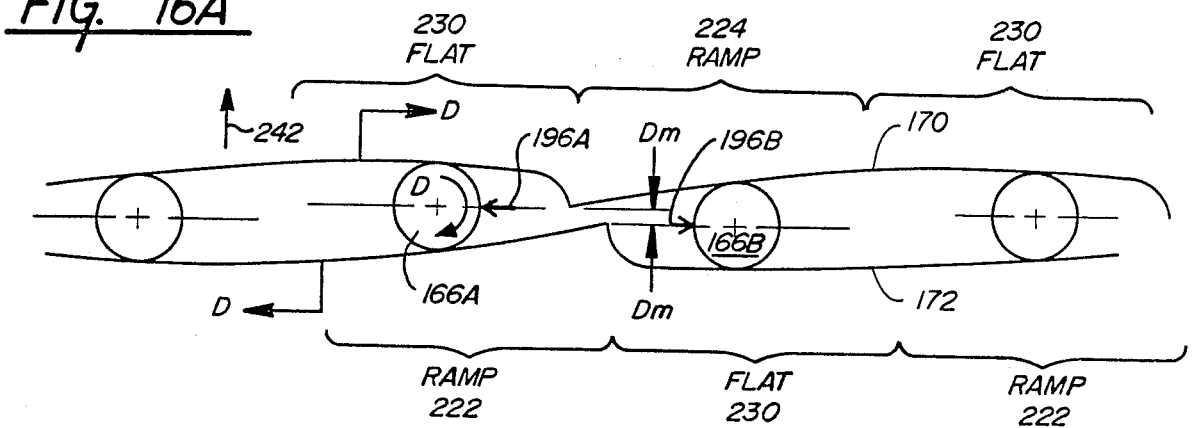

Further reduction of slippage can be obtained by use of the embodiment shown in FIG. 16 and 16A. The embodiment of FIG. 16A can be viewed as a hybrid of the embodiments of FIGS. 12 and 13. Ramp sections 222 and 224 in FIG. 13A correspond to ramp sections 226 and 228 in FIG. 16A, respectively. Flat sections 230 in FIG. 16A correspond to flat section 233 in FIG. 12A. Opposite forces 196A and 196B in FIG. 16A are applied to bearings 166A and 166B by the ramps, tending to drive the bearings in opposite directions. When the bearings are caged within the cage 210 in FIG. 15, the opposite forces cancel, and any tendency for slippage to occur between the outer race 170 and the inner race 172 is reduced or eliminated.

In FIG. 16, bearings 166 share a common centerline 201. However, when the bearings move to the positions shown in FIG. 16A, the centerlines become separated by distance Dm. The separation results because ramp 222 drives bearing 166A upward, in the direction of arrow 242, while bearing 166B remains on flat region 230.

Figure 14:
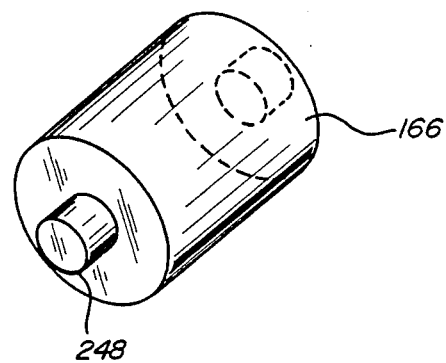
FIG. 14 illustrates in detail a bearing roller which can be used.

The separation is accommodated by slots 246 in FIG. 15 in the cage 210, within which trunnions 248 in FIG. 14 travel. The trunnions travel up and down, as indicated by arrows 250 in FIG. 15, as distance Dm in FIG. 16A requires.

The preceding discussion has assumed that the slopes of the ramps have been equal, although perhaps opposite as shown in FIG. 16A. However, it may be advantageous to design the ramps to have unequal slopes, as will now be explained.

Figure 17A:
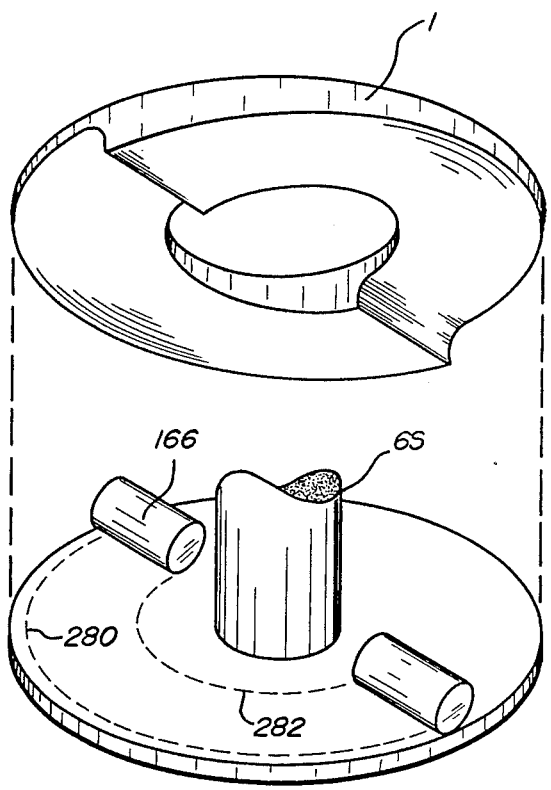
FIG. 17A illustrates a type of bearing race having fewer bearings than that shown in FIG. 11.
Figure 17:
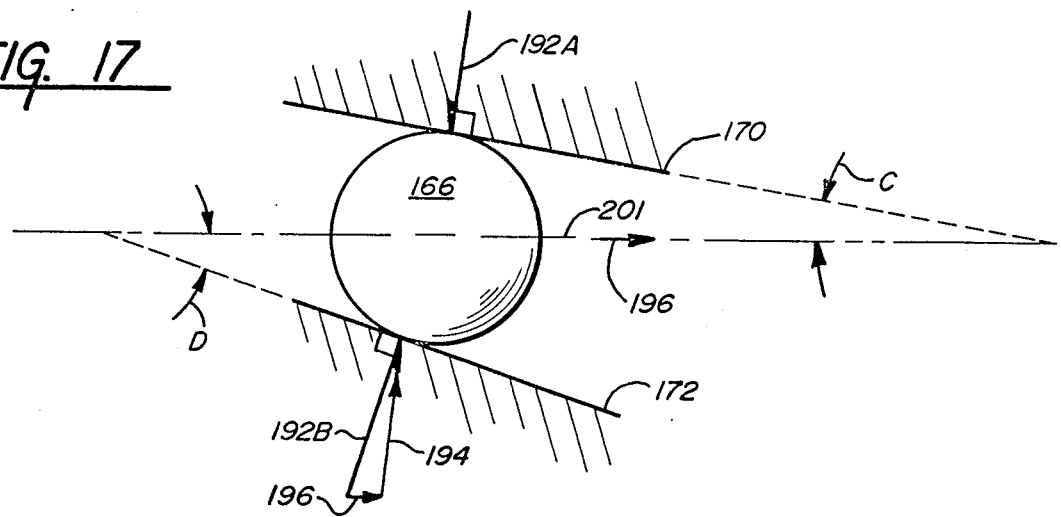
FIG. 17 illustrates races having different slopes.

FIG. 17 illustrates an outer race 170 having a slope indicated by angle C, and an inner race 172 having a slope indicated by angle D. In general, angle C does not equal angle D. The net force 196 on the bearing 166 is obtained by resolving one of the pair of normal forces 192A and 192B into components such that one component is co-linear with the other normal force. In this example, component 194 is colinear with normal force 192. The remaining component 196 indicates the resulting force upon the bearing 166, and is redrawn on centerline 201. Therefore, in this example, the net force tends to drive the bearing to the right.

FIG. 18 illustrates several possible bearing races which along which bearing 166 may run. For example, if inner race 260 (flat) and outer race 263 (ramped) are used, it is clear that a net force 196 tends to drive the bearing 166 to the left. However, if the situation were reversed, so that outer race 265 (flat) were used, while the inner race 268 (ramped) were used, a net displacing force 196B would exist tending to drive the bearing 166 to the right. Therefore, it is clear that the designer can determine the direction (left or right) of the net force by proper choice of an intermediate pair of race slopes such as x and y.

Figure 16B:
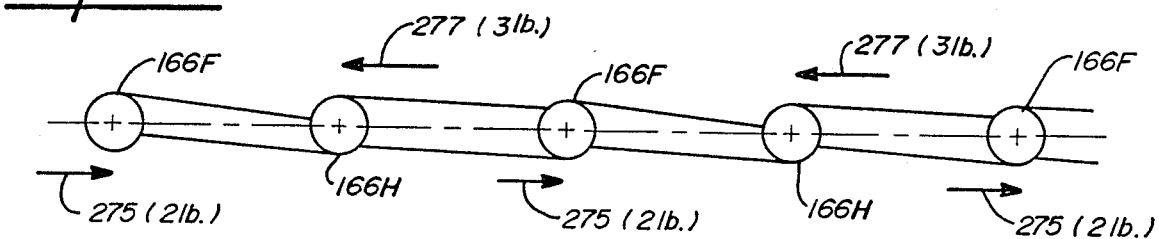

Further, the amount of slope of the ramps determines the amount of force. For example, the use of ramp 263 and flat 260 will result in a larger leftward force than the use of less steep ramp 270 and the same flat 260. This fact has significance in the situation when an odd number of bearings is used, as shown in FIG. 16B.

That Figure shows five bearings, all assumed to lie within a cage 210 in FIG. 15. If the displacing force on each bearing in FIG. 16B were equal, the net force would be unbalanced, because two equal forces would point in one direction (e.g., leftward), while three equal forces would point in the opposite direction (rightward, in this example.)

However, if the forces on three bearings 166F were all equal at, say, two pounds, and pointing rightward, as indicated by arrows 275, while the forces on the remaining two bearings 166H were equal at three pounds, pointing leftward, as indicated by arrows 277, then the net force on cage 210 in FIG. 15 which contains the bearings would be zero.

If cage 210 in FIG. 15 is used with the embodiment shown in FIG. 16B, slots 246 in FIG. 15 must have a particular shape, as will now be explained. FIG. 19 illustrates the embodiment of FIG. 16, but redrawn slightly. Further, FIG. 19 shows the races in two different positions, positions 290 and 295. The bearings 166R1 and 166S1 in the first position 290 are shown in phantom in the second position 295. (The bearings have been numbered 166 so far. In FIG. 19, two different bearings are indicated as 166R and 166S. Further, each has two positions, for example, 166R1 and 166R2.) Several dots, such as dots 301A–301D indicate the points of contact of bearings 166R and S in the two positions 290 and 295.

The separation 307 between the bearings 166R and 166S changes as the races go from position 290 to position 295. That is, bearing 166R moves distance x along ramp 300, but its horizontal travel is less, namely a travel of x cosine k. However, the horizontal movement of other bearing 166S is equal to x. Therefore, distance 305 is greater than distance 307, because the left bearing 166R moved rightward by a distance x cosine k, while the right bearing 166S moved rightward by a distance x, which is necessarily greater than x cosine k. Thus, the bearings tend to separate.

Figure 20:
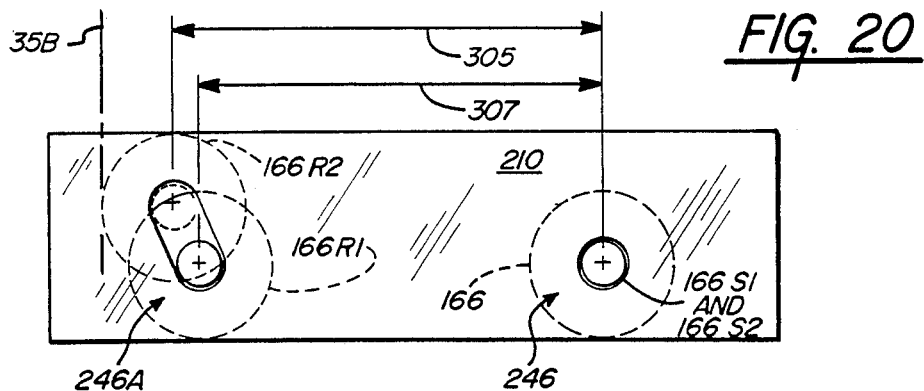
FIG. 20 illustrates slots in the cage in FIG. 15.

The separation can be accommodated by sloping the slots 246 as shown in FIG. 20. The bearings are numbered the same in FIGS. 19 and 20, and distances 305 and 307 correspond in those Figures.

Figure 1:
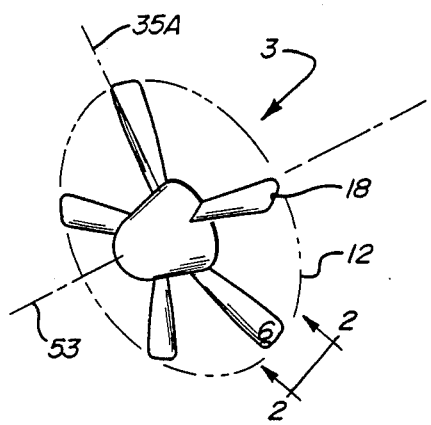
FIG. 1 illustrates an aircraft propeller.

Slot 246A is slanted (i.e., not parallel with a vertical line 35B, which is parallel with the pitch axis 35A in FIG. 1) in order to allow distance 307 to increase to distance 305 as the bearings move between the positions shown in FIG. 19.

Several important features of the invention are the following. One, in the discussion above, the surfaces of the races (e.g., ramp 228 in FIG. 16A) have been assumed to be flat. However, it may be preferred that they have a particular curved configuration, with the curve being of a compound type which provides a force opposing the total moment of the CTM, GTM and FM. The compound curve will be explained with reference to FIGS. 21–25.

Figure 21:
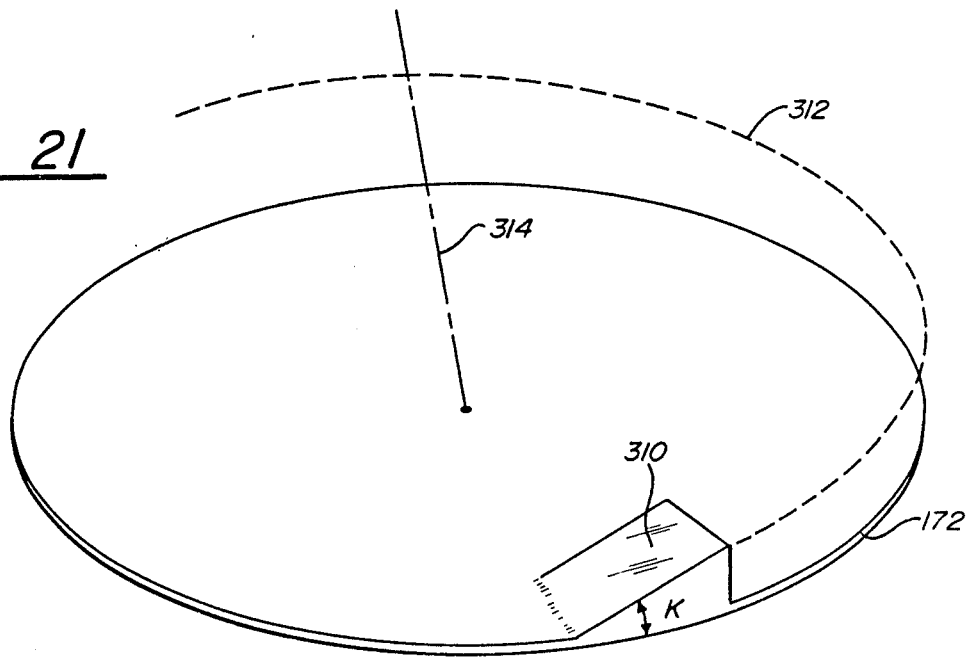
FIG. 21 illustrates a ramp of the type 170A in FIG. 11.

In FIG. 21, ramp 310 corresponds to ramp 170B in FIG. 11. In FIG. 21, ramp 310 follows a generally helical path about axis 314, indicated by path 312. The torque (corresponding to force 196 in FIG. 15) provided by ramp 310 is constant (because of the constant helix pitch angle K) and is used to oppose frictional moment, FM, which is relatively constant as a function of blade pitch.

Figure 23:
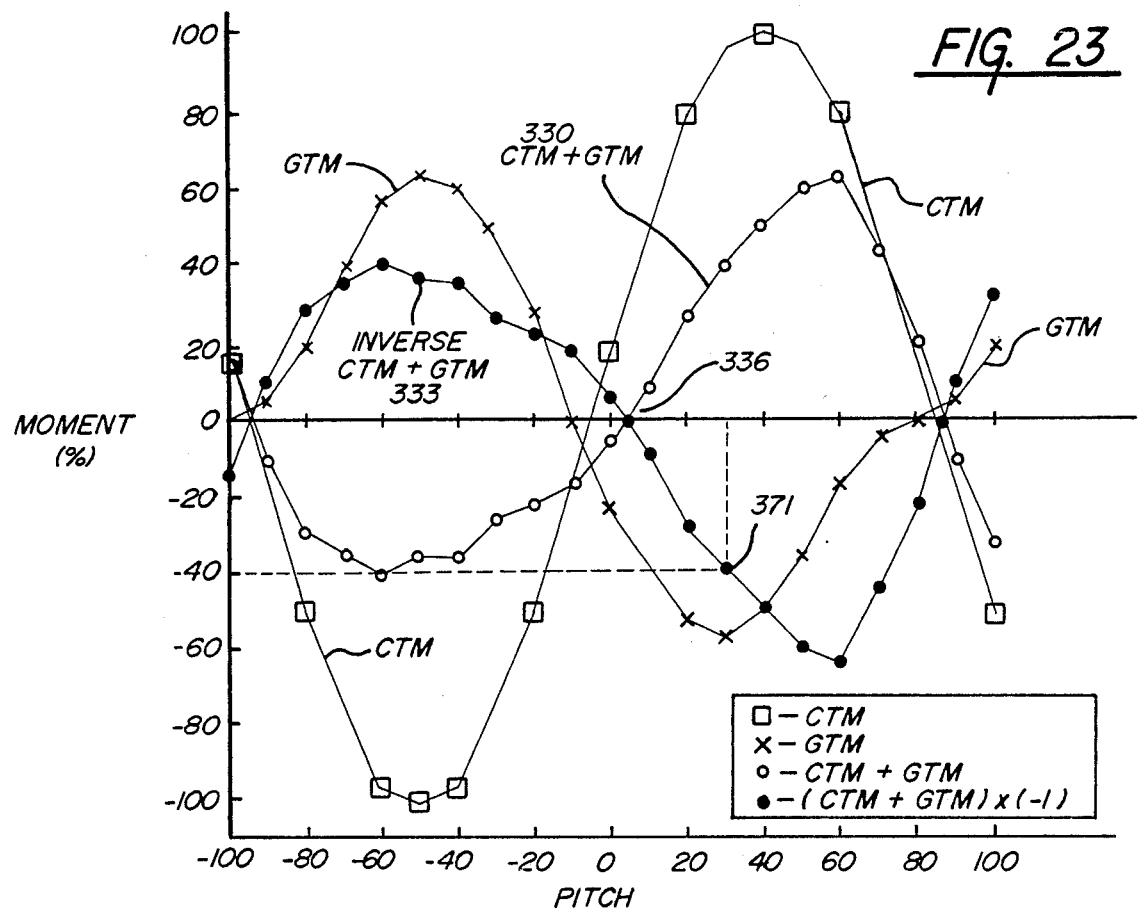
FIG. 23 is a plot of centrifugal- and gas twisting moments as functions of blade pitch. The units on the vertical axis are percent of maximum moment.

The other two moments, CTM and GTM, are plotted against propeller pitch in general fashion in FIG. 23. Also, the sum of CTM and GTM is plotted as curve 330. Curve 330 represents the total CTM and GTM acting on the blade, and which tends to drive the blade to near flat pitch, as indicated by the crossing of the pitch axis at point 336, which is near zero, or flat, pitch.

Figure 22:
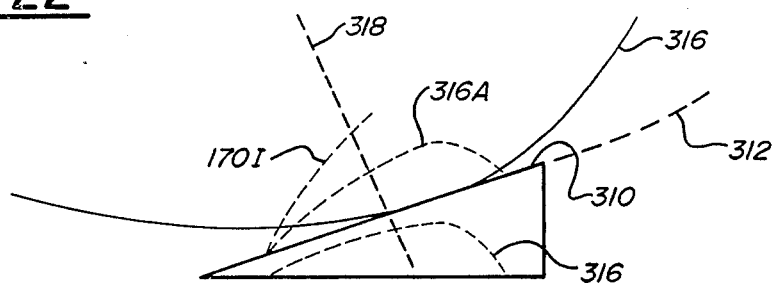
FIG. 22 is a side view of the ramp in FIG. 21.

In order to neutralize CTM and GTM, the shape of ramp 310 in FIG. 21 is modified as shown in FIG. 22. In that Figure, a curved ramp 316 is shown. The curved ramp 316 provides a moment opposing the sum 330 of CTM and GTM in FIG. 23. When curved ramp 316 is added to ramp 310 in FIG. 22, the resulting ramp 316A provides a torque opposing CTM, GTM, and, in addition, FM.

It is recognized that curved ramp 316 in FIG. 22, in representing the inverse 333 of the sum of CTM and GTM in FIG. 23, can be viewed as the sum, or superposition, of two individual curved ramps (not shown), one opposing CTM and the other opposing GTM. Thus, in this sense, curved ramp 316 is a compound curve composed of two sub-curves. Further, curved ramp 316A is, in turn, a compound curve composed of ramp 310 and curve 316. An example will illustrate the construction of curved ramp 316A.

Figure 24:
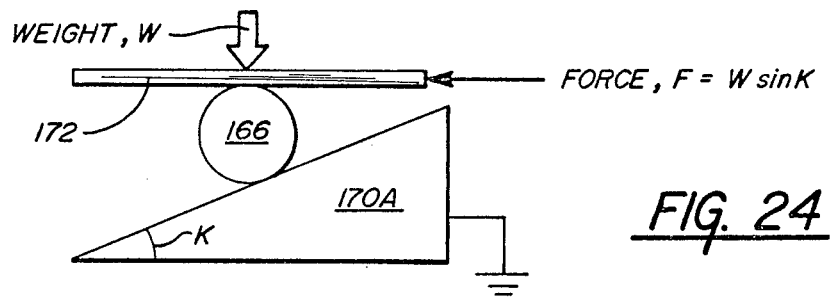
FIG. 24 illustrates computation of force which produces a moment in a system such as that in FIG. 11.

In FIG. 24, ramp 170A corresponds to ramp 170A in FIG. 11, and race 172 and roller 166 have corresponding components. The leftward force F on race 172 in FIG. 24 resulting from weight W (W corresponds to the centrifugal load of the blade 6 in FIG. 8) is given by the expression W sin K, wherein K is the angle indicated. Similarly, if the ramp is curved, as is ramp 170F in FIG. 25, the force F is given by the same expression, but K is the angle with respect to a tangent 367 of the ramp.

Figure 25:
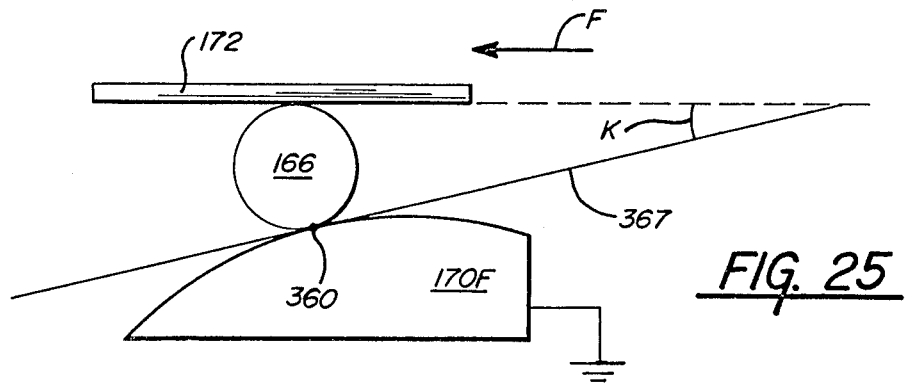
FIG. 25 illustrates a variant of FIG. 24.

The curved ramp 170F is designed such that W sin K equals the force required by plot 333 in FIG. 23. For example, if point 360 in FIG. 25 corresponds to a pitch of positive 30 degrees, indicated by point 371 in FIG. 23, then the curved ramp 170F in FIG. 25 is constructed such that W sin K causes the −40 percent moment indicated in FIG. 23 for point 371.

FIG. 23 indicates that the CTM plot resembles a type of sinusoid. Consequently, the shape of the curved ramp 316 in FIG. 22 will also be a type of sinusoid, if designed to oppose CTM only. In one form of the invention, the period, phase angle, and magnitude of the sinusoidal ramp are chosen to exactly balance CTM.

Two, merely neutralizing, or balancing, the sum of CTM, GTM, and FM will cause a static condition of the propeller blades to exist: there is no tendency to move toward or away from feathered pitch. If one wishes to attain feathered pitch, one further superimposes a ramp such as 170A in FIG. 11 upon curved ramp 316A in FIG. 21, as indicated as ramp 170I.

Three, a sinusoidal ramp 316A in FIG. 22 is not strictly necessary. A helical ramp 310 in FIG. 21 with a sufficiently large angle K can be used to overcome CTM, GTM and FM. In addition, ramp 316A in FIG. 22 can be described as "generally helical" because the ramp, when replacing a ramp 170A in FIG. 11, causes a radially inward and outward motion of rollers 166 when race 170 rotates with respect to race 172.

Four, in the embodiment of FIG. 19, there is no slippage between the races 170 and 172. That is, it may be (erroneously) thought that, since the upper point of contact 301A of bearing 166R1 travels a horizontal distance x, while the lower point of contact 301B travels a shorter horizontal distance x cosine k, therefore, the bearings must slip.

However, the inventor points out that the total movement of both upper points of contact 301A and 301C equals the total movement of both lower points of contact 301B and 301D, the total for each being x plus x cosine k.

Five, the embodiment shown in FIG. 11 allows ninety degrees of rotation of the lower race 172 with respect to the upper race 170, as indicated. If greater rotation is desired, the number of ramps can be decreased, as shown in FIG. 17A. However, the decrease in the number of ramps is accompanied by a decrease in the number of bearings, from four to two, so that the load upon each bearing increases. If the load becomes excessive, the number of bearings can be increased, as shown in FIG. 18A. In that Figure, a cage 210 contains an outer ring of bearings 166O, which would occupy an outer circle 280 in FIG. 17A, and an inner ring of bearings 166I, which would occupy an inner circle 282 in FIG. 17. The larger number of bearings reduces the loading on the individual bearings.

Six, the invention can be viewed as a mechanism for converting radial motion into rotational motion, or change in blade pitch. For example, in the embodiment of FIG. 8, the radial motion of the blade 6 indicated by arrow 156 is converted into blade pitch change indicated by arrow 159 by the thread 153. The blade 6 "corkscrews" out of the hub 150 and into feathered pitch. A similar corkscrewing occurs with the bearing system shown in FIG. 11.

Further, a portion of the energy needed for rotation of the blade is obtained from the radial motion of the blade. That is, motion in the direction of arrow 156 in FIG. 8 provides energy (work equals force times distance travelled) for rotating the blade, as shown by arrow 159, against the centrifugal twisting moment.

The force involved in applying the torque (torque equals a force times the length of a moment arm) is illustrated in FIG. 13A. The normal force 190, at the left of the Figure, can be resolved into components 401 and 404. Component 404, which causes the torque, is derived from the centrifugal force 156 by the bearing-ramp system.

Seven, the bearing system in FIG. 11 can be viewed as a thrust bearing which has been modified to convert the thrust provided by centrifugal force into a torque for assisting in pitch change motions. The ramps 170A–170D provide the torque. That is, the bearing system is not only a fail-safe device, but can also be used to reduce the torque required to overcome the moments existing in the blade, such as gas-twisting moment, during ordinary pitch change activity.

Figure 2A:
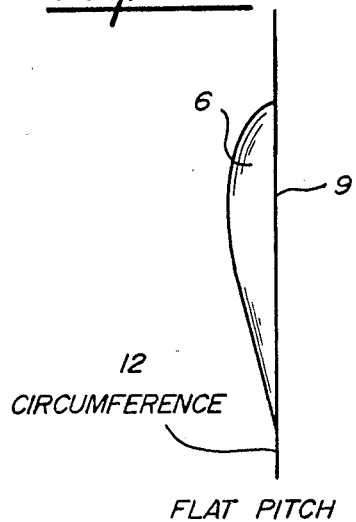
FIG. 2A illustrates flat blade pitch.
Figure 3A:
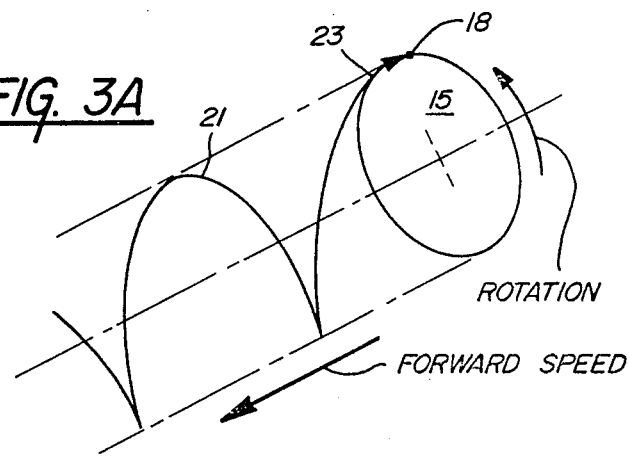
FIGS. 3A and 3B illustrate the helical paths taken by the tips of the propeller blades in FIG. 1.
Figure 3B:
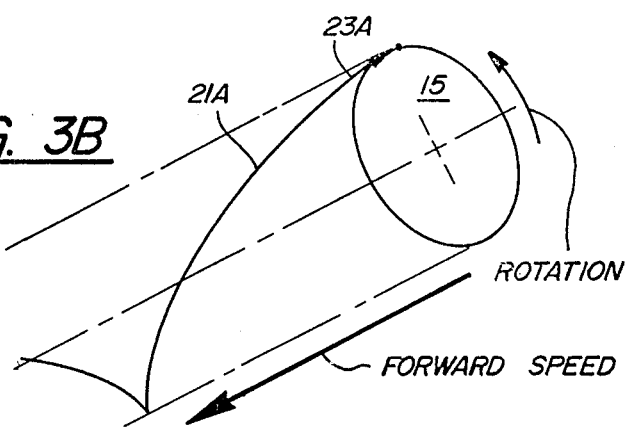

Eight, in the art, motion of a blade 6 in FIG. 2 toward a feathered pitch angle is referred to as a coarsening in pitch. Similarly, movement toward the flat pitch position shown in FIG. 2A is termed motion toward fine pitch.

Nine, the invention is not limited to use in aircraft propellers. The invention may be viewed as a generalized thrust bearing which converts thrust into a torque, or rotational force. For example, thrust is the force (not shown) in FIG. 19 which drives the ramps 170 and 172 toward each other and compresses the rollers 166RI and 166SI between the ramps. Because of the shapes of the ramps, the thrust tends to drive the upper ramp 170 to the left, and the lower ramp 172 to the right, thus applying opposite torques to each. Further, as stated above, the ramps need not be flat but may be sinusoidal or helical, as shown in FIGS. 21 and 22. Still further, if the slope of the ramp is not constant, as with ramp 316A in FIG. 22, then the torque will vary, depending on the relative positions of ramps 170 and 172 in FIG. 18A. That is, the torque will vary depending upon the relative rotational positions of the ramps, or bearing races.

Ten, while cylindrical rollers are shown in FIG. 11, it is understood that the term "bearing rollers" covers ball bearings as well as roller bearings.

Numerous substitutions and modifications can be undertaken without departing from the true spirit and scope of the invention as defined in the following claims.

What is desired to be covered by Letters Patent is the invention as defined in the following claims.

1. A fail-safe mechanism for an aircraft propeller, comprising:
    (a) a propeller blade having a shank and an axis therein;
    (b) a first bearing race annular about the shank and having two or more surfaces which are generally helical about the axis;
    (c) a second, generally helical, bearing race fastened to the shank, which is not parallel with the first bearing race; and
    (d) a plurality of bearing rollers between the first and second bearing races, which experience displacing forces during operation because of the lack of parallelism between the first and second bearing races.

2. A mechanism according to claim 1 in which the first bearing race has a non-constant pitch angle.

3. A mechanism according to claim 2 and further comprising:
    (a) a cage which maintains a predetermined spacing between the bearing rollers.

4. A mechanism according to claim 1 in which the geometry of the bearing races is such that not all displacing forces are in the same direction.

5. A mechanism according to claim 4 in which the number of bearing rollers is odd and in which the vector sum of the net displacement forces is substantially zero.

6. A fail-safe mechanism for an aircraft propeller, comprising:
    (a) a propeller blade having a shank and an axis therein and fastened to a rotor;
    (b) a first bearing race fastened to the shank, and having flat and ramped race regions thereon;
    (c) a second bearing race fastened to the rotor, and having flat and ramped race regions thereon;
    (d) bearing rollers having trunnions and located between the first and second races, and being of two types, namely, (1) rollers between flat regions on the second race and ramped regions on the first race, and (2) rollers between ramped regions on the second race and flat regions on the first race; and
    (e) a cage for maintaining a predetermined spacing between bearing rollers, the cage containing slots for restraining the trunnions, and the slots being non-parallel to accommodate separation of adjacent rollers which occurs during relative rotation of the first and second races.

7. An aircraft propulsion system, comprising:
    (a) a propeller blade having a shank region;
    (b) a thrust bearing surrounding the shank region and including
        (i) a first bearing race which:

(A) is attached to the shank region
(B) is generally helical, with non-constant pitch angle;
(ii) a plurality of bearing rollers contacting the first bearing race at respective first contact points; and
(iii) a second bearing race which:
(A) is attached to a rotor which carries the blade;
(B) is generally helical, non-parallel to the first bearing race, and has a non-constant pitch angle; and
(C) contacts the bearing rollers at respective second contact points, such that pairs of respective first and second contact points do not lie on a common diameter of their respective roller.

8. An aircraft propulsion system, comprising:
(a) a propeller blade having a shank region;
(b) a thrust bearing connecting the shank region with a rotor carrying the blade and including
(i) first and second bearing races which are annular about the shank, with rollers between the races, the races having pitch angles such that
(A) centrifugal load of the blade causes the blade to rotate toward a feathered pitch angle; and
(B) the races contact the rollers at points which do not lie on a common diameter of the rollers, thereby applying displacing forces to the rollers.

9. An aircraft propulsion system, comprising:
(a) a rotor;
(b) at least one propeller blade carried by the rotor and having a shank;
(c) a plurality of first ramps on the rotor, each having a ramp surface facing radially inward, and located around the shank of the blade;
(d) a bearing roller on each ramp;
(e) a plurality of second ramps on the shank of the blade, each having a ramp surface which
(i) faces radially outward and
(ii) contacts a respective bearing; in which the pitch angle of the first ramp contacting a given bearing roller is different from the pitch angle of the second ramp contacting the same bearing roller, thereby applying a displacing force to the roller.

10. Apparatus according to claim 9 in which the pitch angle of some of the ramps is approximately zero.

11. An aircraft propulsion system, comprising:
(a) a rotor;
(b) at least one propeller blade carried by the rotor and having a shank;
(c) a plurality of first ramps on the rotor, each having a ramp surface facing radially inward, and located around the shank of the blade;
(d) a bearing roller on each ramp;
(e) a plurality of second ramps on the shank of the blade, each having a ramp surface which
(i) faces radially outward and
(ii) contacts a respective bearing; in which the pitch angle of the first ramp contacting a given bearing roller is different from the pitch angle of the second ramp contacting the same bearing roller, thereby applying a displacing force to the roller; and
(f) means for connecting the rollers together to reduce displacement induced by the displacing forces.

12. An aircraft propulsion system, comprising:
(a) a rotor;
(b) at least one propeller blade carried by the rotor;
(c) a plurality of first ramps on the rotor, each having a ramp surface facing radially inward, and located around the shank of the blade;
(d) a bearing roller on each ramp;
(e) a plurality of second ramps on the shank of the blade, each having a ramp surface which
(i) faces radially outward and
(ii) contacts a respective bearing; in which the pitch angle of the first ramp contacting a given bearing roller is different from the pitch angle of the second ramp contacting the same bearing roller, thereby applying a displacing force to the roller, and in which all pitch angles on the first ramps are not identical and all pitch angles on the second ramps are not identical, thereby causing differential axial motion of the bearing rollers when the first and second ramps rotate with respect to each other;
(f) a cage for connecting the rollers together to reduce displacement induced by the displacing force; and
(g) means in the cage for accommodating the differential axial motion of the bearing rollers.

13. Apparatus according to claim 12 in which the pitch angles of some ramps are opposite to the pitch angles of other ramps, thereby causing displacement forces on some rollers to be opposite to the displacement forces on other rollers.

14. Apparatus according to claim 13 and further comprising means for connecting all rollers together, so that the opposite displacement forces cause no substantial displacement in any roller.

* * * * *